(12) United States Patent
Sugawara

(10) Patent No.: US 8,688,767 B2
(45) Date of Patent: Apr. 1, 2014

(54) DISTRIBUTED PROCESSING SYSTEM, DISTRIBUTED OPERATION METHOD AND COMPUTER PROGRAM

(75) Inventor: Tomoyoshi Sugawara, Tokyo (JP)

(73) Assignee: Nec Corporation, Tokyo (JP)

( * ) Notice: Subject to any disclaimer, the term of this patent is extended or adjusted under 35 U.S.C. 154(b) by 432 days.

(21) Appl. No.: 13/121,222

(22) PCT Filed: Sep. 25, 2009

(86) PCT No.: PCT/JP2009/004879
§ 371 (c)(1),
(2), (4) Date: Mar. 28, 2011

(87) PCT Pub. No.: WO2010/035480
PCT Pub. Date: Apr. 1, 2010

(65) Prior Publication Data
US 2011/0185007 A1 Jul. 28, 2011

(30) Foreign Application Priority Data
Sep. 26, 2008 (JP) ................ P2008-247706

(51) Int. Cl.
*G06F 15/16* (2006.01)

(52) U.S. Cl.
USPC ........... 709/201; 718/100; 718/102; 718/103; 718/107

(58) Field of Classification Search
USPC ....................................... 709/201
See application file for complete search history.

(56) References Cited

U.S. PATENT DOCUMENTS 5,692,192 A * 11/1997 Sudo .......................... 718/105
6,047,323 A * 4/2000 Krause ....................... 709/227
7,162,719 B2 * 1/2007 Schmidt ..................... 718/104

(Continued)

FOREIGN PATENT DOCUMENTS

| JP | 8-77118 A | 3/1996 |
|---|---|---|
| JP | 2004078465 A | 3/2004 |
| JP | 2004-234114 A | 8/2004 |
| JP | 2005070952 A | 3/2005 |
| JP | 2006244481 A | 9/2006 |
| JP | 2007536657 A | 12/2007 |

OTHER PUBLICATIONS

International Search Report for PCT/JP2009/004879 mailed Nov. 10, 2009.

(Continued)

*Primary Examiner* — Tauqir Hussain
(74) *Attorney, Agent, or Firm* — Sughrue Mion, PLLC

(57) ABSTRACT

In a distributed processing in which multiple operation transportation methods can be used, a method is proposed which efficiently selects an operation transportation method in accordance with conditions of the distributed system. In view of this, a first computer is provided which includes: a first operation transportation portion which conducts multiple transportation methods that transports, for example, processes to a computer to execute them; a second operation transportation portion; and a selection information storing portion storing information used for selection from the multiple transportation methods. Further, a second computer is provided which includes a first operation receiving portion that conducts operations in accordance with the multiple transportation methods. The first computer includes a transportation request portion which detects information from the selection information storing portion for selecting a transportation method that is operable for the second computer and which selects the first operation transportation portion based on the detection result, and the first operation transportation portion selected by the transportation request portion transports, for example, a process to the first operation receiving portion of the second computer.

6 Claims, 6 Drawing Sheets

(56) References Cited

U.S. PATENT DOCUMENTS

| | | | |
|---|---|---|---|
| 7,536,525 B2* | 5/2009 | Chandrasekaran et al. | 711/165 |
| 8,074,262 B2* | 12/2011 | Scarlata | 726/4 |
| 8,280,944 B2* | 10/2012 | Laadan et al. | 709/202 |
| 2004/0267758 A1* | 12/2004 | Katsurashima | 707/10 |
| 2007/0180436 A1* | 8/2007 | Travostino et al. | 717/138 |
| 2009/0157882 A1* | 6/2009 | Kashyap | 709/227 |
| 2009/0300606 A1* | 12/2009 | Miller et al. | 718/1 |

OTHER PUBLICATIONS

"Citrix XenServer", Citrix, [online], <URL: http://www.citrix.co.jp/products/xenser/benefit.html>.

"VMware vSphere", VMware, [online], <URL: http://www.vmware.com/jp/products/vi/vc/vmotion.html>.

Japanese Office Action for JP Application No. 2010-530736 mailed on May 7, 2013 with Partial English Translation.

* cited by examiner

FIG. 4A

```
Comp1, [Process]
Comp2, [VM]
```

FIG. 4B

```
Process,mig_process
VM,mig_vm
```

DISTRIBUTED PROCESSING SYSTEM, DISTRIBUTED OPERATION METHOD AND COMPUTER PROGRAM

TECHNICAL FIELD

The present invention relates to, for example, a distributed processing system, a distributed operation method and a computer program.

The present application is the National Phase of PCT/JP2009/004879, filed Sep. 25, 2009, which claims priority based on Japanese Patent Application No. 2008-247706, filed in Sep. 26, 2008, the content of which is incorporated herein by reference.

BACKGROUND ART

In general, each computer connected to a communication network is called a "computer node". Further, a system having multiple computer nodes (hereinafter, "node") is called a "distributed system" or a "cluster system". In the cluster system, an operation transportation technique is used in which an operation body on a computer (computer program executed on the computer) is transported to another computer to improve efficient use of computer resources and achieve high reliability.

As a typical operation transportation technique, a process migration is generally known. The process migration is a technique which transports a computer program being executed on a node (hereinafter, "process") to another computer while saving environments of execution and continues the operation under the same environments as the computer on which the computer program is initially executed. In other words, the process migration is a technique of transportation of the operations conducted on a computer process-by-process basis. In concrete steps of the process migration, first, snapshots of, for example, a memory state and a state of registers of the process are generated. Further, the snapshots are transmitted to another computer, and the environments of the process are recovered on another computer based on the snapshots (see Patent Document 1). The snapshot is a generic name of data picked up at a predetermined time. In the process migration, in one case, the snapshot is output to a file, and in another case, the snapshot is temporally generated and stored on a memory.

In addition, in recent years, a virtual machine migration is generally known in which the operations are transported not by using process-by-process basis, but by using virtual-machine-by-virtual-machine basis. A difference from the process migration is an object to be transported that is changed from the process to a virtual machine in the virtual machine migration. The virtual machine migration include steps of generating the snapshots of a memory state and a state of registers, transmits the snapshots to another computer and reconstructs the environments on another computer roughly in the same manner as in the process migration. Here, the virtual machine is generated by dividing a computer into multiple virtual computers, and it is possible to execute an independent operating system and application programs on each virtual computer. Software that provides the virtual machine is generally called a virtual machine monitor which has a function of using a specific computer resource like multiple computer resources. VMWare and Xen are generally known as such a virtual machine monitor. These virtual machine monitors respectively have VMotion and XenMotion as operation transportation functions on a virtual-machine-by-virtual-machine basis (see Patent Document 2, Non-Patent Document 1 and Non-Patent Document 2).

PRIOR ART DOCUMENTS

[Patent Document 1] Japanese Patent Application, First Publication No. 2004-78465
[Patent Document 2] Japanese Patent Application, First Publication No. 2006-244481
[Non-patent Document 1] "Characteristics and benefits of Citrix XenServer", [online], Citrix, [searched in Aug. 21, 2008] via Internet <URL: http://www.citrix.co.jp/products/xenser/benefit.html>
[Non-patent Document] "VMware VMotion", [online], VMware, [searched in Aug. 21, 2008] via Internet <URL: http://www.vmware.com/jp/products/vi/vc/vmotion.html>

DISCLOSURE OF INVENTION

In conventional distributed processing systems, a system is designed so as to independently operate such operation transportation methods, for example, one system which provides a process migration can transport only processes, and another system which provides a virtual machine migration can transport only virtual machines. Therefore, there is a problem in that there is no effective means of selecting the process migration or the virtual machine migration.

The present invention was conceived based on the problem recognized as above. The present invention has an object to provide a method in which, when it is possible to use multiple operation transportation methods, for example, a process migration and a virtual machine migration, an operation transportation method is effectively selected.

The present invention is conceived to resolve the above-described problem. One aspect of the present invention is a distributed processing system which transports one of at least two types of operation bodies from a first information processing apparatus to a second information processing apparatus, wherein the first information processing apparatus includes: at least a pair of first transport portions which correspond to at least a pair of types of transportation methods in accordance with the two types of the operation bodies and which conducts transportation operations of the operation bodies; a transportation method selection information storing portion storing information used for selecting the transportation method; a transportation method selection portion which determines one of the transportation methods that is operable for the second information operation apparatus in reference to the transportation method selection information storing portion and selects one of the first transportation portions; and a control portion which receives a request from outside and requests the selected first transportation portion to transport the operation body, and wherein the second information processing apparatus includes a second transportation portion which conducts a transportation on the operation body transported from the selected first transport portion by using at least one of the transportation methods.

Further, a second aspect of the present invention is the above-described distributed processing system, wherein the transportation method selection information storing portion stores transportation method identification information for identifying said plurality of transportation methods, and the transportation method selection portion the transportation method identification information from the transportation method selection information storing portion corresponding to the transportation method identification information of the transportation method that is conducted by the second transportation portion.

Further, a third aspect of the present invention is the above-described distributed processing system, wherein the second information operation apparatus is multiple, the transportation method selection information storing portion stores both predetermined information operation apparatus identification information for identifying the second information operation apparatuses and information for selecting transmission operations that are operable for the second information operation apparatuses while maintaining a correspondence relationship between them, and when both the information operation apparatus identification information of the second information operation apparatus of a transportation destination and the information for selecting the transportation method of the second information operation apparatus are input to the transportation method selection information storing portion, the transportation method selection portion detects the information for selecting the transportation method corresponding to the information operation apparatus identification information from the transportation method selection information storing portion and selects one of the first transportation portion which corresponds to the transportation method based on the detected information for selecting the transportation method.

Further, a fourth aspect of the present invention is the above-described distributed processing system, the operation body includes a process and a virtual machine, the first transportation portion conducts a process migration and a virtual machine migration, and the second transport portion conducts at least one of the process migration and the virtual machine migration.

Further, a fifth aspect of the present invention is the above-described distributed processing system, the first transportation portion and the second transportation portion are capable of at least both the process migration and the virtual machine migration, the transportation method selection information storing portion receives and stores information of a process operating on the second information processing apparatus, when transporting the operation body, the transportation method selection portion detects the information of the process which is operating on the second information processing apparatus from the transportation method selection information storing portion and selects one of the first transportation portion in accordance with limitations on executing the process corresponding to the detected information of the process.

Further, a sixth aspect of the present invention is a distributed operation method of a distributed processing system which transports one of at least two types of operation bodies from a first information processing apparatus to a second information processing apparatus, including: a step of, at the first information processing apparatus, based on a request from outside, referring to information used for selecting from at least a pair of types of transportation methods that correspond to the two types of the operation bodies; a step of, at the first information processing apparatus, determining a transportation method which is operable for the second information processing apparatus; a step of, at the first information processing apparatus, conducting a transportation in accordance with the detected transportation method; and a step of, at the second information processing apparatus, conducting a transportation operation on the operation body using at least one of the transportation methods.

Further, a seventh aspect of the present invention is a computer program of a first information processing apparatus of a distributed processing system which transports one of at least two types of operation bodies from the first information processing apparatus to a second information processing apparatus, including: a step of, based on a request from outside, referring to information used for selecting from at least a pair of types of transportation methods that correspond to the two types of the operation bodies; a step of determining a transportation method which is operable for the second information processing apparatus; and a step of conducting a transportation in accordance with the detected transportation method.

In accordance with the present invention, when it is possible to use multiple operation transportation methods in a distributed processing system, a constitution is designed to select an operation transportation method which can be accepted by an information processing apparatus that is a destination of transportation. Therefore, in accordance with the present invention, it is possible to select an operation transportation method without complicated operations by an administrator and a management program, and it is possible to improve efficiency when making a determination regarding selection of an operation transportation method.

BRIEF DESCRIPTION OF THE DRAWINGS

FIG. 4A is a drawing showing a file format of node constitution information and transportation function information of the first embodiment of the present invention.

FIG. 4B is a drawing showing a file format of node constitution information and transportation function information of the first embodiment of the present invention.

BEST MODE FOR CARRYING OUT THE INVENTION

First Embodiment

Hereinafter, one embodiment for implementing the present invention is explained.

Figure 1:
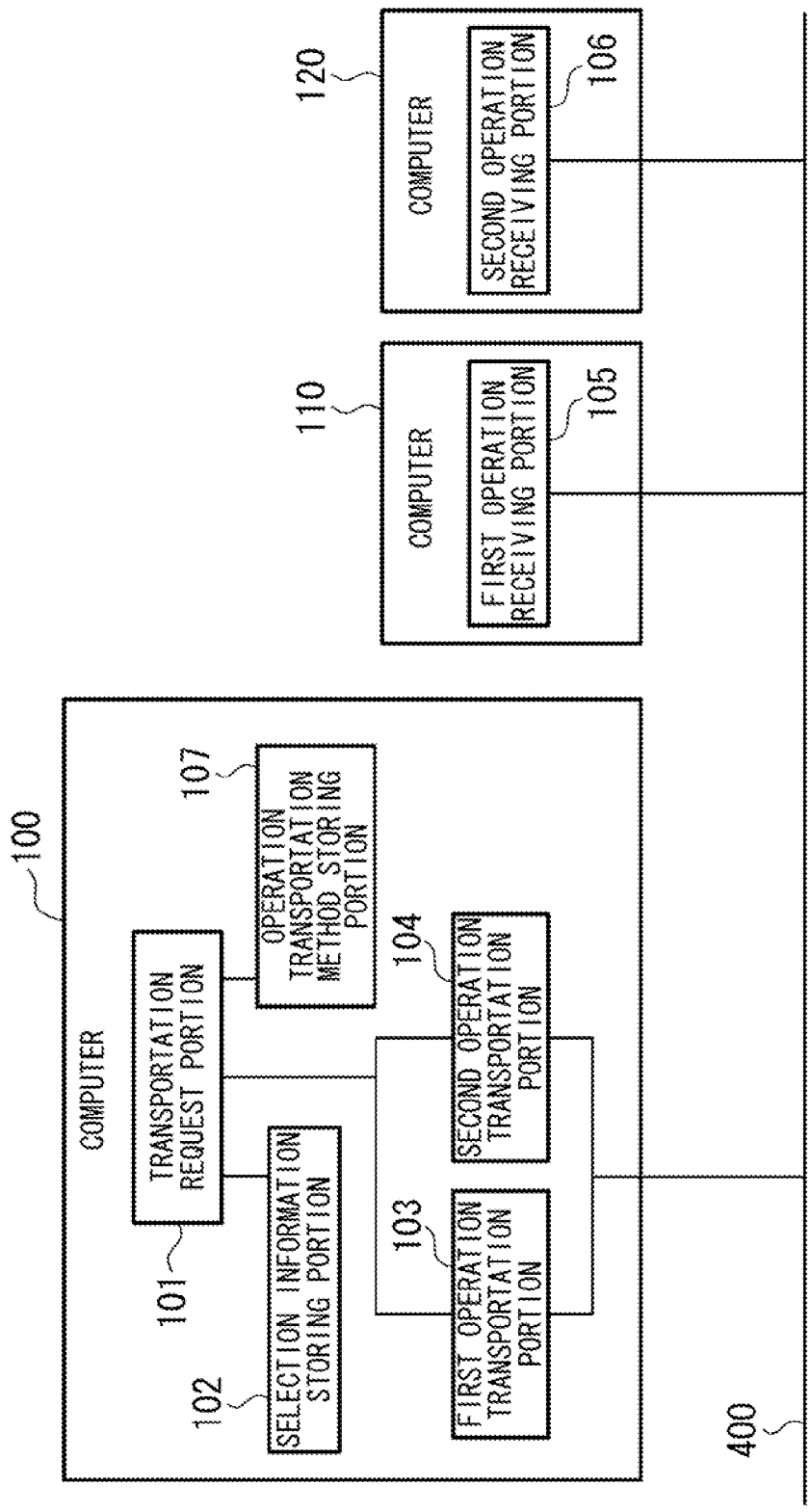
FIG. 1 is a configuration diagram of a distributed system of a first embodiment of the present invention.

FIG. 1 is a configuration diagram of a distributed system of a first embodiment of the present invention. FIG. 1 includes a computer 100 which is an information processing apparatus (hereinafter, "computer"), a computer 110, a computer 120 and a network 400. The computer 100 includes: a transportation request portion 101; a selection information storing portion 102 which stores information necessary for determining a type of an operation transportation method; a first operation transportation portion 103 which conducts an operation of a first operation transportation method; a second operation transportation portion 104 which conducts an operation of a second operation transportation method; and an operation transportation method storing portion 107. Further, the computer 110 includes a first operation receiving portion 105 which conducts an operation of the first transportation method. In addition, the computer 120 includes a second operation receiving portion 106 which conducts an operation of the second transportation method.

The transportation request portion 101 reads information stored in the selection information storing portion 102 and the operation transportation method storing portion 107 and selects one of the first and second operation transportation methods which is applied to an operation transportation based on the read information. The transportation request portion 101 requests one of the first operation transportation portion 103 and the second operation transportation portion 104. For example, it is possible to suppose a combination in which a process migration is the first operation transportation method, and a virtual machine migration is the second operation transportation method.

It should be noted that it is possible to implement the transportation request portion 101 as a command, a library function or a system call which is provided by a management OS and which is used to issue a request for an operation transportation by inputting a command by an administrator or used to issue a request for an operation transportation by a management program. Here, the management OS is an OS which conducts a management operation on the overall computer 100. Further, when the administrator invokes the transportation request portion 101 by inputting commands, or when the management program calls the transportation request portion 101, at least both an identifier (hereinafter, transportation target operation identifier) which indicates an operation body of a transportation target and a node identifier which indicates a computer that is a destination of transportation are input to the transportation request portion 101. Therefore, it is possible to specify both an operation body which is a transportation target executed on the computer 100 and a node to which the operation body that is a transportation target is transported. Here, an operation body is a computer program being executed on a computer and includes, for example, a process or a virtual machine.

The selection information storing portion 102 stores information which is necessary for selecting an operation transportation method by the transportation request portion 101. Here, the information necessary for selecting the transportation method includes at least both a node identifier which is used for specifying a computer that is an operation transportation destination and an identifier (hereinafter, operation transportation method identifier) indicating operation transportation methods that are acceptable for a computer which is the operation transportation destination.

In a constitution shown in FIG. 1, for example, a node identifier indicating the computer 110 is described as "Comp1", a node identifier indicating the computer 120 is described as "Comp2", an operation transportation method identifier indicating the first operation transportation method is described as "Process", and an operation transportation method identifier indicating the second operation transportation method is described as "VM". Here, when the first operation transportation method "Process" is acceptable for the computer 110, it is possible to describe in a manner of "Comp1, [Process]". When the second operation transportation method "VM" is acceptable for the computer 120, it is possible to use an expression of "Comp2, [VM]".

The operation transportation method storing portion 107 stores both an identifier indicating a transportation method and a function for calling the transportation method. For example, when a function for calling the first operation transportation method "Process" is described as "mig_process", the operation transportation method storing portion 107 stores an expression of a combination of "Process, mig_process". When a function for calling the second operation transportation method "VM" is described as "mig_vm", the operation transportation method storing portion 107 stores an expression of a combination of "VM, mig_vm". Here, the first operation transportation portion 103 which conducts the first operation transportation method is called by the mig_process function. The second operation transportation portion 104 which has the second operation transportation method is called the mig_vm function.

The first operation transportation portion 103 generates a snapshot of the transportation target operation. The first operation transportation portion 103 transmits the snapshot to the first operation receiving portion of a computer which is specified as a transportation destination by using the first operation transportation method. The second operation transportation portion 104 generates a snapshot of the transportation target operation. The second operation transportation portion 104 transmits the snapshot to the second operation receiving portion of the computer which is specified as a transportation destination by using the second operation transportation method.

It should be noted that at least both the transportation target operation identifier and the node identifier which indicates a computer that is the transportation destination are transmitted from the transportation request portion 101 to both the first operation transportation portion 103 and the second operation transportation portion 104. However, there is a possibility in which there are differences between the transportation target identifier which is input to the transportation request portion 101, a form of the transportation target operation identifier transmitted to the first operation transportation portion 103 and a form of the transportation target operation identifier transmitted to the second operation transportation portion 104. In such a case, it is possible to add and conduct a conversion operation for adjusting the form of the transportation target operation identifier when the transportation request portion 101 calls the first operation transportation portion 103 and the second operation transportation portion 104.

For example, a case is assumed in which the first operation transportation method is the process migration, the second operation transportation method is the virtual machine migration, and a program name "ServiceA" is input to the transportation request portion 101. In such a case, it is possible to convert the program name "ServiceA" so as to conform to a form of a parameter of a function to be called, for example, it is possible to convert the program name "ServiceA" to an integer value which is a number indicating a process before calling the first operation transportation method (process migration), or it is possible to convert the program name "ServiceA" to an integer value which is a number indicating a VM before calling the second operation transportation method (virtual machine migration).

The first operation receiving portion 105 receives the snapshot of an operation body which is the transportation target and is transmitted from the first operation transportation portion 103, and reconstructs execution conditions of the operation body based on the snapshot. The second operation receiving portion 106 receives the snapshot of an operation body which is the transportation target and is transmitted from the second operation transportation portion 104, and reconstructs execution conditions of the operation body based on the snapshot.

Figure 2:
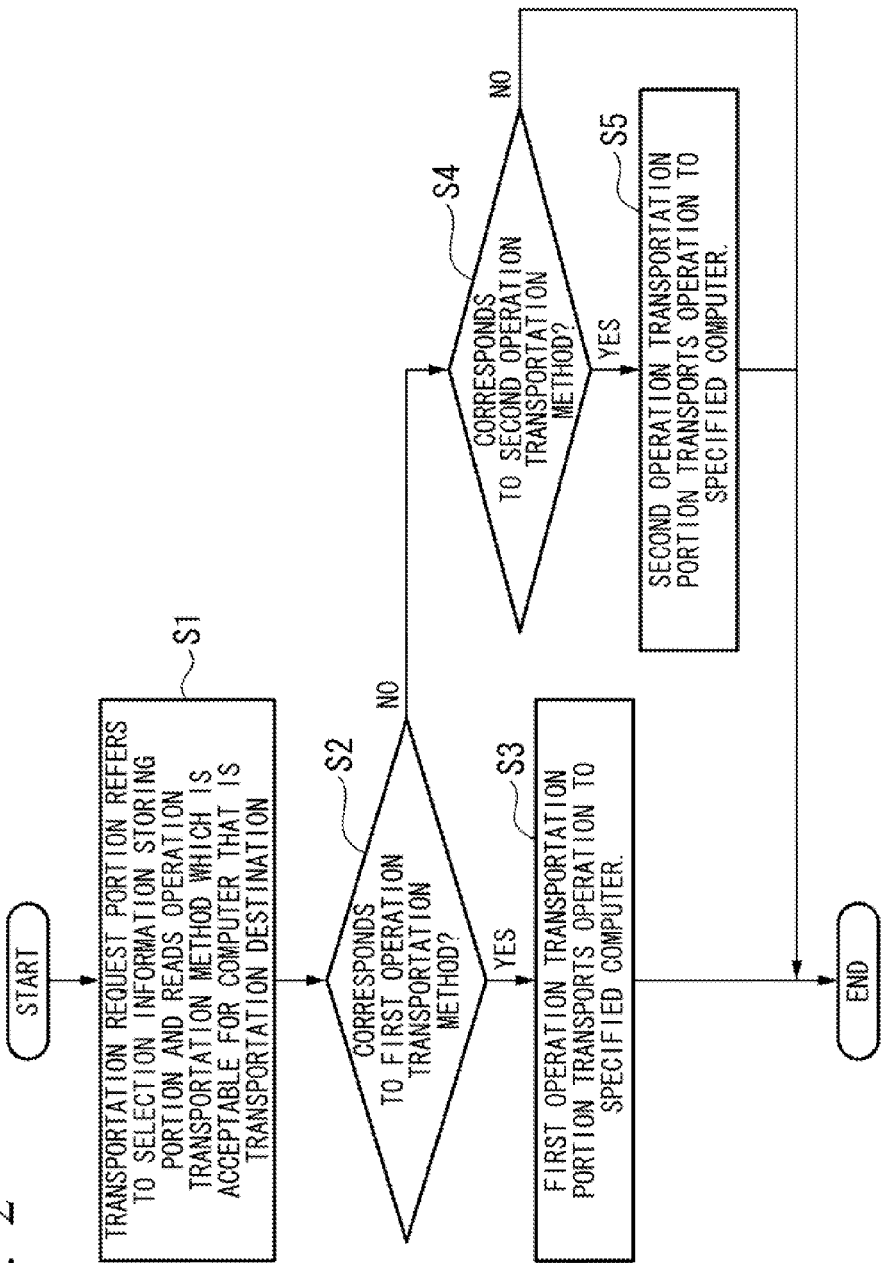
FIG. 2 is a flowchart of determining an operation transportation method of the first embodiment of the present invention.

FIG. 2 is a flowchart of determining an operation transportation method. In reference to FIG. 2, operation transportation steps are explained. When an administrator inputs an operation transportation command via a terminal, the transportation request portion 101 is invoked. In another way, a management program invokes the transportation request portion 101 in accordance with an operation transportation request command. The transport request portion 101 receives from the selection information storing portion 102 a registered item (hereinafter, "entry") of the selection information to which both the node identifier which indicates a computer that is the transportation destination specified when being called and operation transportation methods that are acceptable for the node (which is a computer and is a destination of the transportation).

For example, in the same condition as the above-described example, when both entries of "Comp1, [Process]" and "Comp2, [VM]" are included in the selection information storing portion 102, if the node identifier included in the operation transportation request command is "Comp1", an entry of "Comp1, [Process]" is read from the selection information storing portion 102. On the other hand, if the node identifier included in the operation transportation request command is "Comp2", the transportation request portion 101 reads an entry of "Comp2, [VM]" from the selection information storing portion 102 (Step S1).

Further, the transportation request portion 101 reads information regarding the operation transportation method from the read entry of the selection information. The transportation request portion 101 conducts a comparing operation to check whether or not the read information regarding the operation transportation method corresponds to the identifier which indicates the first operation transportation method which is conducted by the first operation transportation portion 103. In other words, the transportation request portion 101 determines whether or not the first operation transportation method which is used upon transmission from the first operation transportation portion 103 is acceptable for the computer which is the transportation destination.

For example, when a transmission of the operation body is attempted from the computer 100 to the computer 110, the operation transportation method identifier of "Process" is picked up from the entry of "Comp1, [Process]". The operation transportation method identifier of "Process" is compared to the identifier of "Process" which indicates the first operation transportation method that is conducted by the first operation transportation portion 103 (Step S2).

When the information regarding the operation transportation method read at Step S1 corresponds to the identifier which indicates the first operation transportation method (YES at Step S1), the transportation request portion 101, in reference to the operation transportation method storing portion 107, by using a function corresponding to the identifier which indicates the first operation transportation method, requests the operation transportation of the first operation transportation portion 103.

For example, in the same condition as the above-described example, when the entry regarding the first operation transportation method is "Process, mig_process", the function "mig_process" is called. In accordance with the request, the first operation transportation portion 103 generates a snapshot of the transportation target operation which is executed on the computer 100. The first operation transportation portion 103 transmits the snapshot to the first operation receiving portion 105 of the computer 110 which is specified as a transportation destination using the first operation transportation method (Step S3).

On the other hand, when the information regarding the operation transportation method read at Step S1 does not correspond to the identifier which indicates the first operation transportation method (NO at Step S1), the transportation request portion 101 conducts a comparing operation to check whether or not the operation transportation method corresponds to the identifier which indicates the second operation transportation method (Step S4).

When the information regarding the operation transportation method corresponds to the identifier which indicates the second operation transportation method (YES at Step S4), the transportation request portion 101, in reference to the operation transportation method storing portion 107, by using a function corresponding to the identifier which indicates the second operation transportation method, requests the operation transportation of the second operation transportation portion 104.

For example, in the same condition as the above-described example, when the entry regarding the second operation transportation method is "VM, mig_vm", the function "mig_vm" is called. The second operation transportation portion 104 generates a snapshot of the transportation target operation which is executed on the computer 100. The second operation transportation portion 104 transmits the snapshot to the second operation receiving portion 106 of the computer 120 which is specified as a transportation destination by using the second operation transportation method (Step S5). When the information regarding the operation transportation method does not correspond to the second operation transportation method (NO at Step S4), the operation transportation is not conducted (NO at Step S4).

The first operation receiving portion 105 of the computer 110 receives the snapshot of an operation that is the transportation target and reconstructs execution conditions of the operation body based on the snapshot. In accordance with such an operation, the computer 110 resumes the operation body which has been executed on the computer 100. In the same or similar manner, the second operation receiving portion 106 of the computer 120 receives the snapshot of an operation that is the transportation target. By reconstructing execution conditions of the operation body based on the snapshot, the computer 120 resumes the operation body which has been executed on the computer 100.

Figure 3:
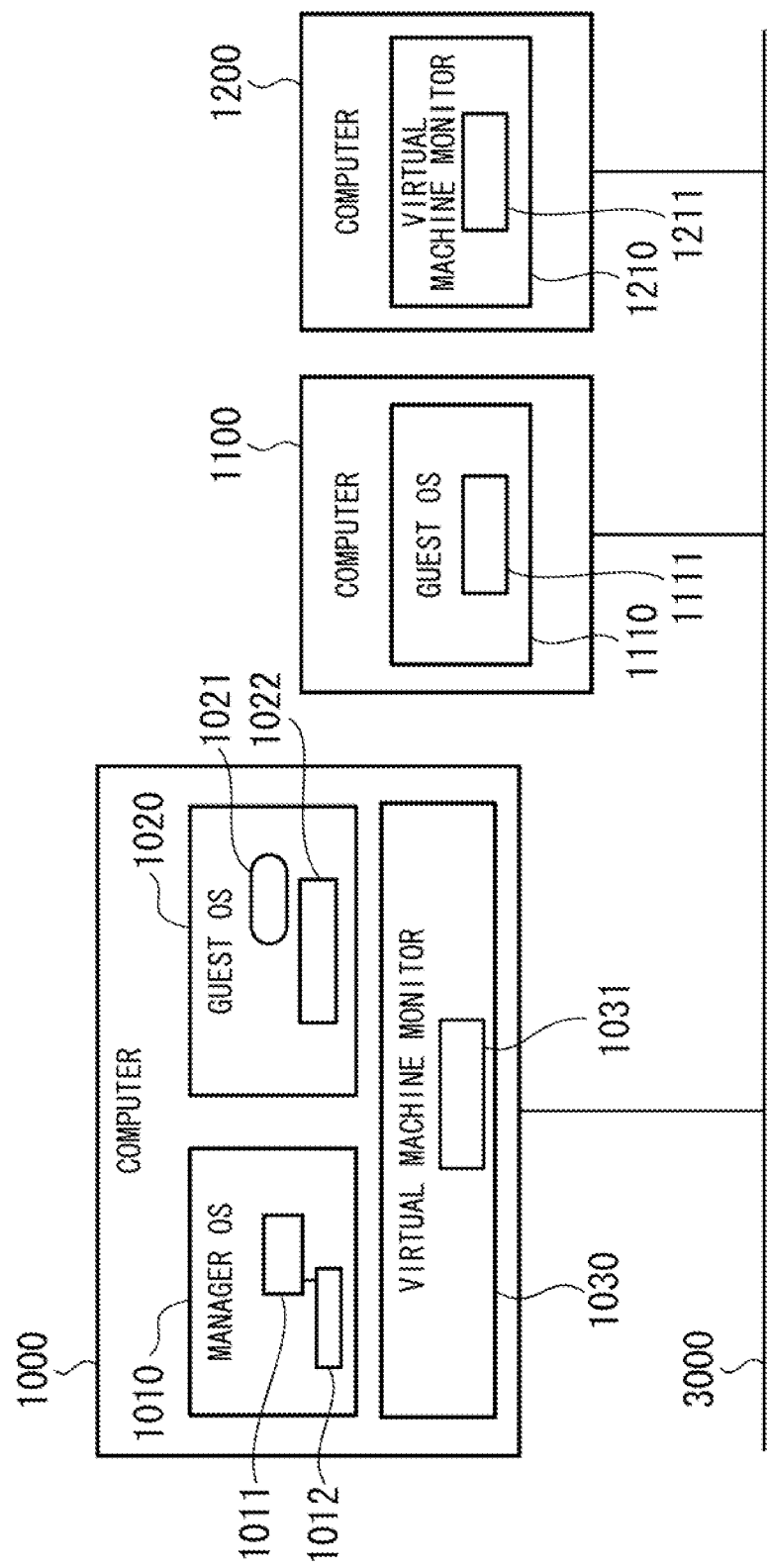
FIG. 3 is a configuration diagram of a distributed system of the first embodiment of the present invention.

FIG. 3 is a configuration diagram of a distributed system of the first embodiment of the present invention. In this embodiment, the distributed system is constituted from a computer 1000, a computer 1100, a computer 1200 and a network 3000. Each computer has at least a central processing unit (hereinafter, CPU (Central Processing Unit)), a primary storage apparatus (hereinafter, memory) and a secondary storage apparatus (for example, a hard disc or a flash memory).

The transportation request portion 101, the first operation transportation portion 103, the second operation transportation portion 104, the first operation receiving portion 105 and the second operation transportation portion 106 of FIG. 1 are stored as computer programs in the secondary storage apparatus, which is, for example, a hard disc in FIG. 3. These constitutional elements are implemented by being read from the secondary storage apparatus, being written on the memory and being executed by the CPU. In addition, the selection information storing portion 102 of FIG. 1 is stored in the secondary storage apparatus which is, for example, a hard disc, is read from the secondary storage apparatus, is written on the memory, and is referred by the CPU.

On the computer 1000, a virtual machine monitor 1030 is operated, and a manager OS 1010 and a guest OS 1020 are operated under control of the virtual machine monitor 1030.

The manager OS 1010 has an operation transportation request command 1011 and a setting file 1012. The transportation operation request command 1011 corresponds to the transportation portion 101 in FIG. 1. The setting file corresponds to the selection information storing portion 102 and the operation transportation method storing portion 107 in FIG. 1.

The guest OS 1020 has a process migration function 1022. The virtual machine monitor 1030 has a virtual machine migration function 1031. When the process migration function is executed by the operation transportation request command 1011 of the manager OS 1010, the process migration function 1022 is called. When the virtual migration function is executed by the operation transportation request command 1011 of the manager OS 1010, the virtual machine migration function is called. The process migration function 1022 corresponds to the first operation transportation portion 105 in FIG. 1. The virtual machine migration function 1031 corresponds to the second operation transportation portion 106 in FIG. 1.

Further, the manager OS 1010 and the guest OS 1020 communicate each other via a virtual network. Here, the virtual network is a virtually existing network provided by the virtual machine monitor 1030. The process migration function executed under control by the manager OS communicates with the guest OS 1020 via such a virtual network and invokes the process migration function 1020.

On the other hand, the virtual machine migration function executed under control by the manager OS invokes the virtual machine migration function 1211 by using a hyper call provided by the virtual machine monitor. Here a hyper call is an interface for calling a function provided by the virtual machine monitor and can be called by the manager OS 1010 and/or the guest OS 1020 operating on the virtual machine monitor.

On the computer 1100, a guest OS 1110 is operating which has the same constitution as the guest OS 1020 operating on the computer 1000. On the other hand, on the computer 1200, a virtual machine monitor 1210 is operating which has the same constitution as the virtual machine monitor 1030 operating on the computer 1000. In other words, it is possible to conduct the process migration from the computer 1000 to the computer 1100, but it is not possible to conduct the virtual machine migration. On the other hand, it is possible to conducts the virtual machine migration from the computer 1000 to the computer 1200, but it is not possible to conduct the process migration.

Further, on the guest OS 1020 operating on the computer 1000, a process 1021 is operating, and by using a program name, it is possible to specify a process which provides with a corresponding service. Here, a program name of the process 1021 is "ServiceA".

In addition, a node identifier of the computer 1100 is described as "Comp1", and a node identifier of the computer 1200 is described as "Comp2". Further, an operation transportation method identifier that indicates the process migration provided by the guest OS 1020 is "Process". An operation transportation method identifier that indicates the virtual machine migration provided by the virtual machine monitor is "VM".

Further, a function for calling the process migration function 1022 is "mig_process". A function for calling the virtual machine migration function 1031 is "mig_vm". Further, correspondence information (herein after, node configuration information) between a node identifier of a computer and an identifier of an operation transportation method which is acceptable for the computer is described in a text form as shown in FIG. 4A. Correspondence information (herein after, transportation function information) between an identifier of an operation transportation method and a function used for calling the operation transportation method is described in a text form as shown in FIG. 4B. The node configuration information and the transportation function information are stored in the setting file 1012.

Here, in FIG. 3, a case is assumed in which the administrator inputs the transportation request command through a terminal, or the transportation request command is executed by the management program. Here, it is assumed that both a program name of "ServiceA" and a node identifier of "Comp1" are passed to the manager OS 1010 as parameters. In other words, it is assumed that a process by which a computer program named "ServiceA" is executed is specified as an operation body that is a transportation target.

In accordance with the operation transportation request command, the manager OS 1010 reads the setting file 1012 and compares the node identifier stored in the node configuration information of FIG. 4A to the node identifier "Comp1" which is passed as a parameter of the operation transportation request command (Step S2 in FIG. 2). Here, a comparing operation by using a character string "Comp1", and a first line of the node configuration information of FIG. 4A matches. After this, based on the operation transportation request command, the manager OS 1010 reads an item which is a latter half of the matched first line. In other words, a character string of "Process" which is the operation transportation method identifier is read, and it is detected that the process migration is acceptable for "Comp1" (Step S2).

After this, the manager OS 1010 compares the operation transportation method identifier stored in the transportation function information of FIG. 4B to the operation transportation method identifier "Process" which is determined before or at Step S2. As a result of such an operation, it is detected that a function corresponding to the operation transportation method identifier of "Process" is "mig_process", the function of "mig_process" is executed, and the process migration function 1022 of the guest OS 1020 is called. An identifier for identifying a process (hereinafter, process identifier) and the node identifier "Comp1" are specified as parameters of the function "mig_process". Here, the process identifier is converted from the program name. For example, it is possible to receive a list of processes by issuing a command provided by the guest OS 1020, it is possible to read a line including the program name from the list, and it is possible to pick the process identifier from the line.

After this, in accordance with the process migration function 1022 which the guest OS 1020 provides with, by conducting the process migration operation shown in a flowchart of FIG. 2 described above, the process 1021 which is designated as a transportation target is transported to the computer 1100 (FIG. 2, Step S3), and on the computer 1100, the guest OS 1020 resumes the process 1021 which has been operated on the computer 1000.

On the other hand, in FIG. 3, it is assumed that both the program name of "ServiceA" corresponding to the process 1021 and the node identifier of "Comp2" as parameters are given to the manager OS 1010 by inputting the operation transportation request command by the administrator via the terminal or by executing the operation transportation request command by the management program, and a process which provides with "ServiceA" is specified as an operation body which is the transportation target.

Based on the operation transportation request command, the manager OS 1010 reads the setting file 1012 and compares the node identifiers stored in the node configuration information shown in FIG. 4A to the node identifier of "Comp2" which is notified as a parameter of the operation transportation request command (FIG. 2, Step S2). Here a comparing operation is conducted by using a string of "Comp2", and a second line of the node configuration information shown in FIG. 2A matches. After this, based on the operation transportation request commend, the manager OS 1010 reads an item which is a latter half of the matched second line. In other words, a character string of "VM" which is the operation transportation method identifier is read, and it is detected that the virtual machine migration is acceptable for "Comp2" (Step S4).

Further, the manager OS 1010 compares the operation transportation method identifier stored in the transportation function information of FIG. 4B to the operation transportation method identifier "VM" which is determined before or at Step S4. As a result of such an operation, it is determined that a function corresponding to the operation transportation method identifier of "VM" is "mig_vm", the function of "mig_vm" is executed, and the virtual machine migration function 1031 of the virtual machine monitor 1030 is called. A virtual machine identifier for identifying a virtual machine and the node identifier "Comp2" are specified as parameters of the function "mig_vm". Here, the virtual machine identifier is converted from the program name. For example, it is possible to receive a list of processes by issuing a command provided by the guest OS 1020, and if the program name is included in the list, it is possible to receive the virtual machine identifier of the virtual machine on which the guest OS 1020 operates by issuing a command provided by the virtual machine monitor 1030.

After this, in accordance with the virtual machine migration function 1031 which the virtual machine monitor 1030 provides with, by conducting the virtual machine migration operation shown in a flowchart of FIG. 2 described above, the virtual machine on which the service is operating that is designated as a transportation target is transported to the computer 1200 (FIG. 2, Step S5), and on the computer 1200, the virtual machine monitor 1030 resumes the virtual machine which has been operated on the computer 1000.

In the first embodiment of the present invention, when it is possible to use multiple operation transportation methods in a distributed system, a constitution is applied in which an operation transportation method is selected so as to conform to operation transportation methods acceptable for a computer of a transportation destination, and due to such a constitution, upon selecting an operation transportation method, it is possible to select an operation transportation method without complicated operations by an administrator and a management program. Therefore, it is possible to improve efficiency upon making a determination regarding selection of an operation transportation method. It should be noted that the multiple operation transportation methods are not limited to the first and second operation transportation methods, and if there are further operation transportation methods, it is possible to apply the present invention to them in a scope of the present invention.

Second Embodiment

Hereinafter, a second embodiment of the present invention is explained. The second embodiment is different from the first embodiment of the present invention because the condition of a node which is a transportation destination is checked beforehand, and an operation transportation method is determined.

Figure 5:
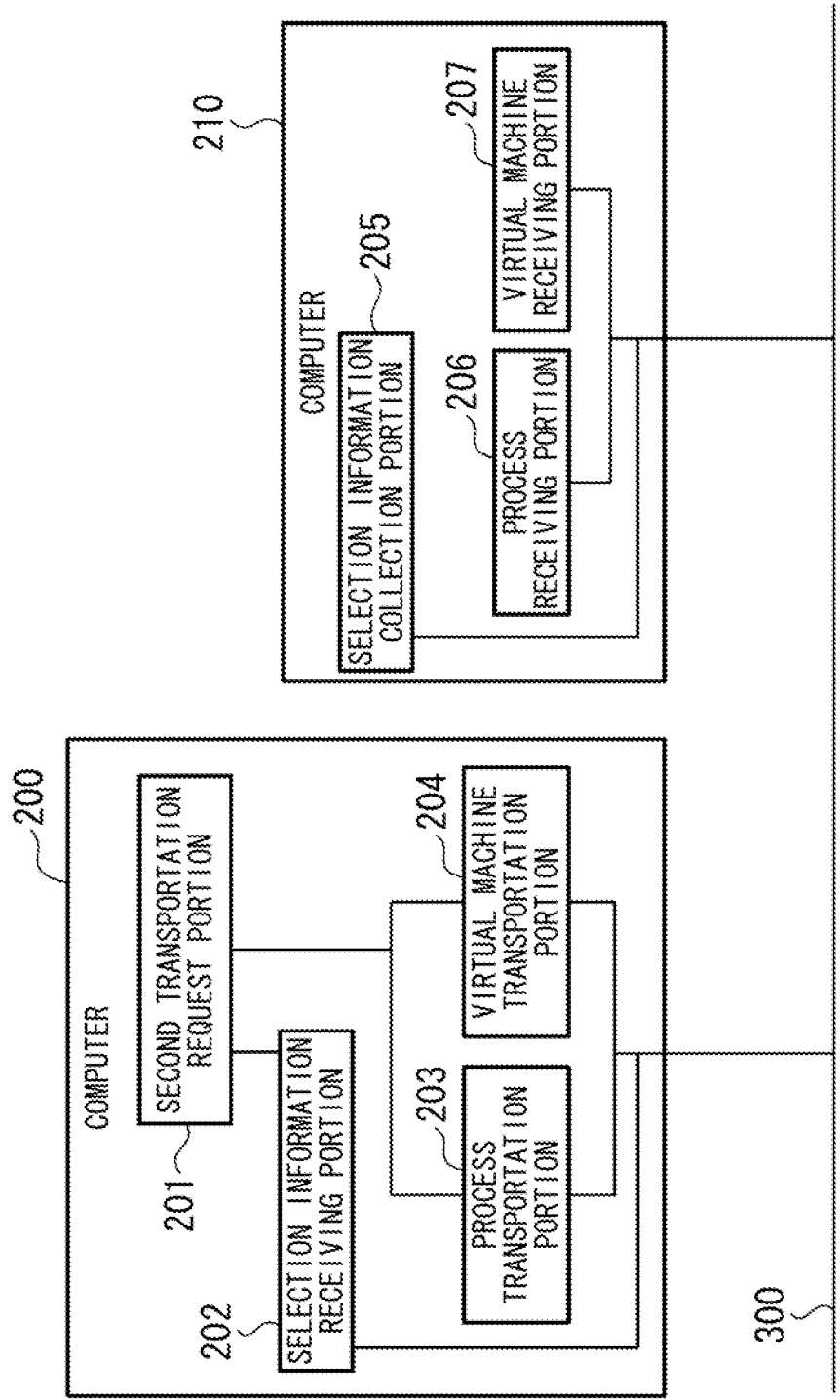
FIG. 5 is a configuration diagram of a distributed system of a second embodiment of the present invention.

FIG. 5 is a configuration diagram of a distributed system of the second embodiment of the present invention. In FIG. 5, the distributed system is constituted from a computer 200, a computer 210, that are operated in accordance with a control by a computer program, and a network 300. Further, the computer 200 includes a second transportation request portion 201, a selection information receiving portion 202 for selecting information which is necessary for a transportation request, a process transportation portion 203 which relates to an operation transportation method and a virtual machine transportation portion 204 which relates to an operation transportation method. Further, the computer 210 includes a selection information collection portion 205 for selecting information which is necessary for a transportation request, a process receiving portion 206 which relates to an operation transportation method and a virtual machine receiving portion 207 which relates to an operation transportation method.

The second transportation request portion 201 memorizes operation transportation methods provided by the process transportation portion 203 and the virtual machine transportation portion 204. Further, the second transportation request portion 201 receives information from the selection information receiving portion 202 that is necessary for determination upon selecting the transportation method. Further, based on the information, the second transportation request portion 201 determines whether the process migration or the virtual machine migration is applied to the computer 210 which is a transportation destination.

It is possible to implement the second transportation request portion 201 as a command, a library function or a system call which is provided by a management OS and which is used to issue a request for an operation transportation by inputting a command by an administrator or used to issue a request for an operation transportation by a management program. Here, the management OS is an OS which conducts a management operation on the overall computer 200. When calling the second transportation request portion 201, at least both the identifier of the operation which is the transportation target and the node identifier of a computer which is a transportation destination are passed to the second transportation request portion 201, and it is possible to detect that the operation body which is operated on the computer 200 and is a transportation target is transported to the computer 210.

Further, the second transportation request portion 201 calls the process transportation portion 203. Otherwise the second transportation request portion 201 calls the virtual machine transportation portion 204.

The selection information receiving portion 202 receives information from the selection information collection portion 205 of the computer 210 that is necessary when the second transportation request portion 201 selects the operation transportation method. The information which is necessary for selecting the operation transportation method includes at least the above-described process identifier, and it is possible to distinguish processes that cannot be executed on the computer 210. In other words, for example, when a process which cannot be executed in parallel on one computer is executed on the computer 210 which is the transportation destination, a process which is the same type as that process is an operation body that is the transportation target, it is possible to select the virtual machine migration in place to the process migration. It should be noted that it is possible to express the process identifier by using a number or a file name.

Here, when a node identifier of the computer 210 is, for example, "Comp1", and when there are processes that are, for example, "ProcessA", "ProcessB" and "ProcessC" that are not acceptable due to a reason in which, for example, a process that cannot be executed in parallel is already executed, the selection information stored in the selection information collection portion 205 is expressed in a form, for example, "Comp1, [ProcessA, ProcessB, ProcessC]". Such a combination of a node identifier and process identifiers are stored in the selection information receiving portion 202 as one or more registration items (entry).

The process transportation portion 203 generates a snapshot of the process specified as an operation body that is the transportation target and transmits the snapshot to the operation receiving portion which can accept the process migration in the computer which is specified as a transportation destination by using the process migration operation.

The virtual machine transportation portion 204 generates a snapshot of the virtual machine on a computer which is specified upon requesting a transportation of the operation body and transmits the snapshot to the virtual machine receiving portion which can accept the virtual machine migration in the computer which is specified as a transportation destination by using the virtual machine migration operation.

The selection information collection portion 205 collects information regarding processes that are not acceptable due to reasons, for example, in which such a process cannot be executed in parallel and is already executed on the computer 210, and transmits such information to the selection information receiving portion 202 on a consistent basis or when receiving a request from the selection information receiving portion 202 of the computer 210. Here, the information regarding processes that are not acceptable for the computer 210 includes at least the above-described process identifiers.

The process receiving portion 206 receives the snapshot of the operation body which is a transportation target transmitted by using the process migration. In addition, the process is recovered based on the snapshot.

The virtual machine receiving portion 207 receives the snapshot of the operation which is the transportation target transmitted by using the virtual machine migration. In addition, the virtual machine is recovered based on the snapshot.

Figure 6:
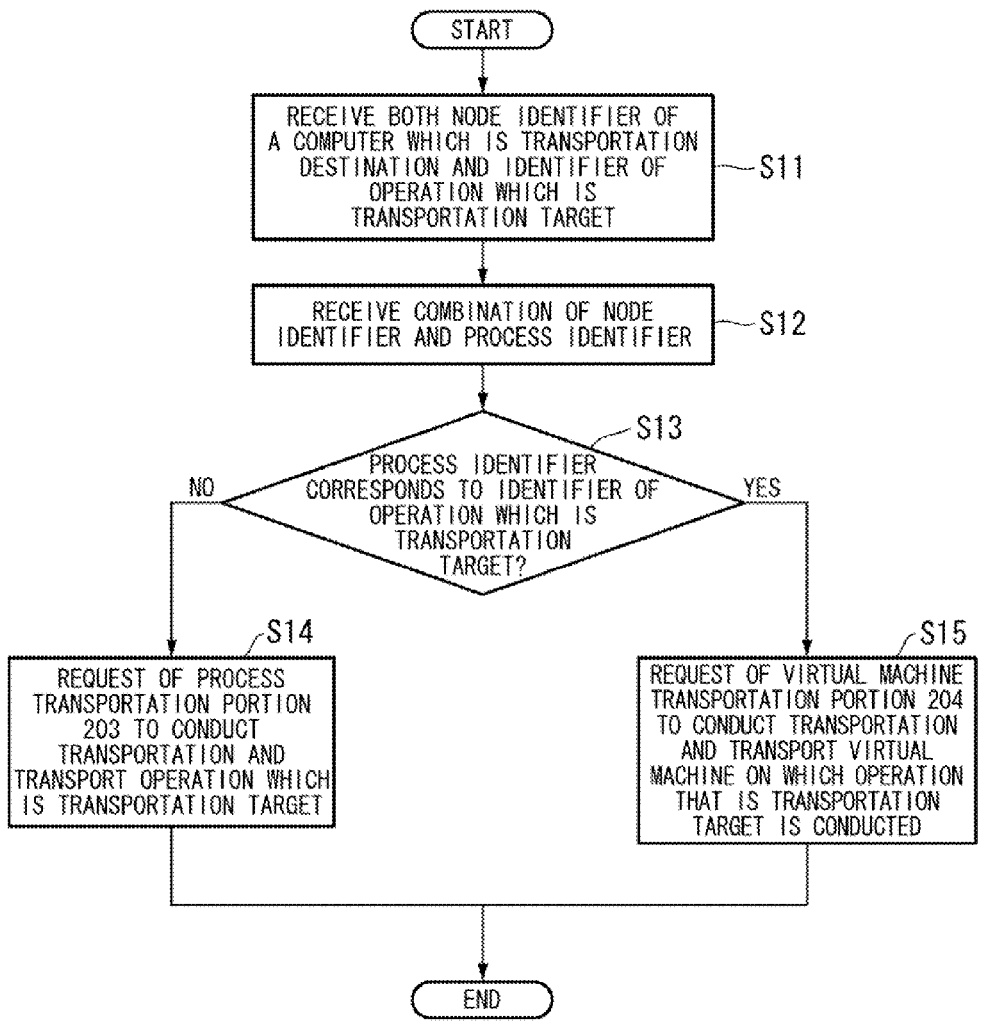
FIG. 6 is a flowchart of determining an operation transportation method of the second embodiment of the present invention.

FIG. 6 is a flowchart of determining an operation transportation method. A transportation operation is explained using FIG. 6. In accordance with a command input by an administrator via a terminal or in accordance with the management program, both a computer which is the operation transportation destination and an operation body which is the transportation target are specified, and the second transportation request portion 201 is called (Step S11). The second transportation request portion 201 receives a registered item of a combination of a node identifier and a process identifier from the selection information receiving portion 202 as the selection information corresponding to the node identifier of the computer 210 which is the operation transportation destination (Step S12).

With regard to the operation body that is the transportation target specified by the administrator by inputting a command via a terminal or the operation body that is the transportation target specified by the management program, the second transportation request portion 201 compares the process identifier included in the registered item of a combination of a node identifier and a process identifier to the identifier of the operation which is the transportation target specified by the administrator or the management program and check and determine whether or not there is a correspondence.

In other words, the transportation request portion 201 tries to transport the operation body determined in accordance with the identifier of the operation that is the transportation target specified by the administrator via a terminal or specified by the management program, however, if the process identifier included in the registered item of a combination of a node identifier and a process identifier corresponds to the identifier of the operation which is the transportation target (Step S13, YES), the transportation request portion 201 determines that it is not possible to use the process migration and determines that a virtual machine migration should be used. The second transportation request portion 201 outputs a request for operation transportation to the virtual machine transportation portion 204. The virtual machine transportation portion 204 generates a snapshot of an operation body which is the specified transportation target and transmits the snapshot to the computer 210 which is specified as a transmission destination (Step S15).

After this, the virtual machine receiving portion 207 of the computer 210 receives the snapshot of the operation transmitted in accordance with the virtual machine migration operation and reconstructs the data based on the snapshot, and it is possible for the computer 210 to resume the operation which has been conducted on the computer 200.

The transportation request portion 201 tries to transport the operation body determined in accordance with the identifier of the operation that is the transportation target specified by the administrator via a terminal or specified by the management program, however, if the process identifier included in the registered item of a combination of a node identifier and a process identifier does not correspond to the identifier of the operation which is the transportation target (Step S13, NO), the transportation request portion 201 decides to use the process migration. The second transportation request portion 201 outputs a request for operation transportation to the process transportation portion 203 which corresponds to the process migration. The process transportation portion 203 generates a snapshot of an operation body which is the specified transportation target and transmits the snapshot to the computer 210 which is specified as a transmission destination (Step S14).

After this, the process receiving portion 206 of the computer 210 receives the snapshot of the operation body transmitted in accordance with the process migration operation and recovers the process based on the snapshot. The computer 210 resumes the operation body which has been executed on the computer 200.

As described above, in accordance with the embodiments of the present invention, when it is possible to use multiple operation transportation methods (for example, a process migration and a virtual machine migration) in a distributed system, a computer which is a transportation destination notifies of processes that are acceptable. Further, because the computer which is the transportation source is constituted so as to select the operation transportation method, even if it is unstable whether or not a process is acceptable in accordance with a type of the process, it is possible to select an operation transmission method without cumbersome operations by an administrator or a management program, and it is possible to improve efficiency of making a determination when selecting an operation transportation method.

As described above, embodiments of the present invention are explained in reference to the drawings, but concrete constitutions are not limited to such an embodiment and include, for example, design changes that stay within the scope of the present invention.

Further, a transportation method selection information storing portion described for the present invention corresponds to the selection information storing portion 102 and the selection information receiving portion 202, a first transport portion corresponds to the first operation transportation portion 103 and the second operation transportation portion 104, a second transportation portion corresponds to the first operation receiving portion 105 and the second operation receiving portion 106, and a transportation method selection portion corresponds to the transportation request portion 101 and the second transportation request portion 201.

Further, if a computer program for implementing each step shown in FIGS. 2 and 6 are recorded on a computer readable storage medium, and if a computer system reads and executes the recorded computer program on the recording medium, it is possible to conduct operations of a communication terminal. It should be noted that it is possible for a "computer system" described here to include an OS (operating system) and/or hardware, for example, peripheral devices.

If the "computer system" uses a WWW system, such computer system includes an environment that can provide homepages (or an environment that can display homepages). Further, the "computer readable storage medium" means storage devices that include a flexible disc, a magneto-optical disc, a ROM, a rewritable nonvolatile memory, for example, a flush memory, a removable medium, for example, a CD-ROM, and a storage device, for example, a hard disc installed in a computer system.

Further, the "computer readable storage medium" includes medium that stores a computer program for a certain time, for example, a volatile memory (for example, a DRAM (Dynamic Random Access Memory)) inside a computer system which can be a server or a client when the computer program is transmitted via a network, for example, Internet, or via a communication line, for example, a telephone line.

Further, the above-described computer program can be transmitted from a computer which stores the computer program in, for example, a storage device to other computer systems via a transportation medium or via transmission waves inside a transmission medium. Here, a "transmission medium" is a medium which has a function of transmitting information, for example, a network (communication network), for example Internet, and a communication line (network line), for example, a telephone line.

Further, the above-described computer program can be a computer program that implements a portion of the above-described functions. In addition, it is possible to implement the above-described functions by linking with computer programs that are already recorded on the computer system, that is, by using differential files (differential programs).

INDUSTRIAL APPLICABILITY

In accordance with the above-described embodiments, it is possible to provide with a computer system that efficiently selects an operation transportation method based on conditions of a distributed system.

BRIEF DESCRIPTION OF THE DRAWINGS

100 . . . computer
101 . . . transportation request portion
102 . . . selection information storing portion
103 . . . first operation transportation portion
104 . . . second operation transportation portion
105 . . . first operation receiving portion
106 . . . second operation receiving portion
107 . . . operation transportation method storing portion
110 . . . computer
120 . . . computer
200 . . . computer
201 . . . second transportation request portion
202 . . . selection information receiving portion
203 . . . process transportation portion
204 . . . virtual machine transportation portion
205 . . . selection information collection portion
206 . . . process receiving portion
207 . . . virtual machine receiving portion
210 . . . computer
300 . . . network
400 . . . network
1000 . . . computer
1010 . . . management OS
1011 . . . virtual machine monitor management program
1012 . . . setting file
1020 . . . guest OS
1021 . . . process
1022 . . . process migration function
1030 . . . virtual machine monitor
1031 . . . virtual machine migration function
1100 . . . computer
1110 . . . guest OS
1111 . . . process migration function
1200 . . . computer
1210 . . . virtual machine monitor
1211 . . . virtual machine migration function
3000 . . . network

The invention claimed is:

1. A distributed processing system which transports one of at least two types of operation bodies from a first information processing apparatus to a second information processing apparatus, wherein
the first information processing apparatus comprises:
hardware, including a processor;
a memory from which a processor executes one or more computer programs to implement:
at least a pair of first transport portions which correspond to at least a pair of types of transportation methods in accordance with the two types of the operation bodies and which conducts transportation operations of the operation bodies;
a transportation method selection information storing portion storing information used for selecting the transportation method;
a transportation method selection portion which selects one of the transportation methods that is operable for the second information operation apparatus in reference to the transportation method selection information storing portion and selects one of the first transportation portions; and
a control portion which receives a request from outside and requests the selected first transportation portion to transport the operation body, and wherein
the second information processing apparatus comprises a second transportation portion which conducts a transportation of the operation body transported from the selected first transport portion by using at least one of the transportation methods, wherein
the second information operation apparatus is plural,
the transportation method selection information storing portion stores both predetermined information operation apparatus identification information for identifying the second information operation apparatuses and information for selecting transmission operations that are operable for the second information operation apparatuses while maintaining a corresponding relationship between them, and
when both the information operation apparatus identification information of the second information operation apparatus of a transportation destination and the information for selecting the transportation method of the second information operation apparatus are input to the transportation method selection information storing portion, the transportation method selection portion detects the information for selecting the transportation method corresponding to the information operation apparatus identification information from the transportation method selection information storing portion and selects one of the first transportation portion which corresponds to the transportation method based on the detected information for selecting the transportation method.

2. The distributed processing system according to claim 1, wherein
the transportation method selection information storing portion stores transportation method identification information for identifying said plurality of transportation methods, and
the transportation method selection portion the transportation method identification information from the transportation method selection information storing portion corresponding to the transportation method identification information of the transportation method that is conducted by the second transportation portion.

3. The distributed processing system according to one of claim 1, wherein
the operation body includes a process and a virtual machine,
the first transportation portion conducts a process migration and a virtual machine migration, and
the second transport portion conducts at least one of the process migration and the virtual machine migration.

4. The distributed processing system according to claim 1, wherein
the first transportation portion and the second transportation portion are capable of at least both the process migration and the virtual machine migration,
the transportation method selection information storing portion receives and stores information of a process operating on the second information processing apparatus,
when transporting the operation body, the transportation method selection portion detects the information of the process which is operating on the second information processing apparatus from the transportation method selection information storing portion and selects one of the first transportation portion in accordance with limitations on executing the process corresponding to the detected information of the process.

5. A distributed operation method of a distributed processing system which transports one of at least two types of operation bodies from a first information processing apparatus to one of a plurality of second information processing apparatuses, comprising:
a step of, at the first information processing apparatus, based on a request from outside, referring to information stored beforehand in a transportation method selection information storing portion used for selecting from at least a pair of types of transportation methods that correspond to the two types of the operation bodies, wherein the transportation selection information storing portion stores both predetermined information operation apparatus and identification information for identifying the second information operation apparatuses and information for selecting transmission operations that are operable for the second information operation apparatus while maintaining a corresponding relationship between them;
a step of, at the first information processing apparatus, selecting a transportation method which is operable for the second information processing apparatus, wherein when both the information operation apparatus identification information of the second information operation apparatus of a transportation destination and the information for selecting the transportation method of the second information operation apparatus are input, the information for selecting the transportation method corresponding to the information operation apparatus identification information is detected form the transportation method selection information storing portion, and the transportation method is selected based on the detected information for selecting the transportation method;
a step of, at the first information processing apparatus, conducting a transportation in accordance with the detected transportation method; and
a step of, at the second information processing apparatus, conducting a transportation operation on the operation body by using at least one of the transportation methods.

6. A computer program stored on non-transitory computer readable medium of a first information processing apparatus of a distributed processing system which transports one of at least two types of operation bodies from the first information processing apparatus to one of a plurality of second information processing apparatuses, comprising:
a step of, based on a request from outside, referring to information stored beforehand in a transportation method selection information storing portion used for selecting from at least a pair of types of transportation methods that correspond to the two types of the operation bodies, wherein the transportation selection information storing portion stores both predetermined information operation apparatus identification information for identifying the second information operation apparatuses and information for selecting transmission operations that are operable for the second information operation apparatus while maintaining a corresponding relationship between them;
a step of selecting a transportation method which is operable for the second information processing apparatus, wherein when both the information operation apparatus identification information of the second information operation apparatus of a transportation destination and the information for selecting the transportation method of the second information operation apparatus are input, the information for selecting the transportation method corresponding to the information operation apparatus identification information is detected form the transportation method selection information storing portion, and the transportation method is selected based on the detected information for selecting the transportation method; and
a step of conducting a transportation in accordance with the detected transportation method.

* * * * *